United States Patent
Shiozawa et al.

(10) Patent No.: US 7,798,799 B2
(45) Date of Patent: Sep. 21, 2010

(54) MEASUREMENT CONTROL METHOD OF AN INJECTION MOLDING MACHINE

(75) Inventors: Fumio Shiozawa, Nagano-ken (JP); Tetsuo Ikeda, Nagano-ken (JP); Kazuki Miyairi, Nagano-ken (JP); Takashi Hakoda, Nagano-ken (JP); Seiichi Sakurada, Nagano-ken (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 357 days.

(21) Appl. No.: 11/898,307

(22) Filed: Sep. 11, 2007

(65) Prior Publication Data

US 2008/0065343 A1    Mar. 13, 2008

(30) Foreign Application Priority Data

Sep. 12, 2006  (JP) .............................. 2006-247366

(51) Int. Cl.
 B29C 45/00 (2006.01)
 B29C 47/00 (2006.01)
(52) U.S. Cl. ........................ 425/149; 425/587; 700/200
(58) Field of Classification Search ......... 700/200–204; 264/40.7, 478, 645, 211.21, 211.23, 297.2, 264/328.1; 425/145–150, 587
 See application file for complete search history.

(56) References Cited

U.S. PATENT DOCUMENTS

| | | | | |
|---|---|---|---|---|
| 5,371,450 | A * | 12/1994 | Hiraoka | 318/560 |
| 5,518,671 | A * | 5/1996 | Takizawa et al. | 264/40.1 |
| 6,284,170 | B1 * | 9/2001 | Hiraoka | 264/40.1 |
| 6,340,439 | B1 * | 1/2002 | Hiraoka | 264/40.1 |
| 6,371,748 | B1 * | 4/2002 | Hara | 425/145 |
| 6,416,694 | B1 * | 7/2002 | Ishikawa | 264/40.1 |
| 6,565,781 | B2 * | 5/2003 | Konno | 264/40.1 |
| 7,021,917 | B2 * | 4/2006 | Uchiyama et al. | 425/149 |
| 7,125,232 | B2 * | 10/2006 | Watanabe et al. | 425/145 |
| 7,235,198 | B2 * | 6/2007 | Shiraishi et al. | 264/40.1 |
| 7,452,198 | B2 * | 11/2008 | Shiraishi et al. | 425/145 |

(Continued)

FOREIGN PATENT DOCUMENTS

JP    6-61800 B2    8/1994

(Continued)

*Primary Examiner*—M. N. Von Buhr
(74) *Attorney, Agent, or Firm*—Birch, Stewart, Kolasch & Birch, LLP

(57) ABSTRACT

An ending target position Xes corresponding to the measurement ending position Xe, a rotation rate pattern Ar to rotate a screw 2, and a hypothetical retraction rate pattern Ab for the screw 2 to retract are set in advance, the remaining rotation rate pattern Ar to stop the screw 2 rotation at the ending target position Xes is predicated by calculation based on the screw position X detected at every specified time interval Ts at the time of measurement, based on which the screw 2 is controlled to rotate to the measurement ending position Xe, the remaining retraction rate pattern Ab to stop the screw 2 retraction at the ending target position Xe based on the screw 2 retraction rate Vd detected at every specified time interval Ts, based on which the screw 2 is controlled to retract to the measurement ending position Xe, the rotation and retraction of the screw 2 are stopped, and subsequently the screw 2 is controlled to reverse rotate by a pre-set constant amount of rotation Rc while position controlling its position to the measurement ending position Xe.

12 Claims, 8 Drawing Sheets

U.S. PATENT DOCUMENTS

| | | | |
|---|---|---|---|
| 2004/0091561 A1* | 5/2004 | Uchiyama et al. | 425/145 |
| 2004/0091567 A1* | 5/2004 | Watanabe et al. | 425/561 |
| 2004/0096534 A1* | 5/2004 | Shiraishi et al. | 425/159 |
| 2004/0175454 A1* | 9/2004 | Thomson | 425/574 |
| 2006/0288791 A1* | 12/2006 | Shiozawa et al. | 73/720 |
| 2008/0065356 A1* | 3/2008 | Kato et al. | 702/183 |
| 2009/0017152 A1* | 1/2009 | Yamada | 425/563 |

FOREIGN PATENT DOCUMENTS

| | | |
|---|---|---|
| JP | 2004-154988 A | 6/2004 |

* cited by examiner

MEASUREMENT CONTROL METHOD OF AN INJECTION MOLDING MACHINE

BACKGROUND OF THE INVENTION

1. Field of the Invention

The present invention relates to a measurement control method of an injection molding machine that can be preferably used in performing measurements by screw rotation.

2. Description of the Relevant Art

In general, an injection cycle of an injection molding machine has a measurement process and an injection process, and during the measurement process, measurement is performed by rotating a screw wherein measurement control is performed so that measurement is ended when the screw is retracted to a preset measurement ending position. Although various types of controls are performed during the measurement process such as rate control, pressure control, and position control, improving control precision for a series of controls in the measurement process is extremely important for securing uniform injection molded product mass and obtaining an injection molded object of high quality, and various kinds of measurement control methods have conventionally been proposed.

For example, disclosed in Japanese Patent Publication No. 6 (1994)-61800 (Patent Document 1) is a measurement control method of an injection molding machine (measurement control device) which, being a control method for retracting a screw by rotating it by a preset number of screw rotations and stopping the screw at a preset measurement ending position, receives a screw position detected by a screw position detection means and a screw retraction rate detected by a screw rate detection means, calculates the number of screw rotations so as to stop the screw at the measurement ending position by a predetermined calculation formula, for sending out the calculated number of screw rotations as a rotation drive command. Further, disclosed in Japanese Laid Open Patent Publication No. 2004-154988 (Patent Document 2) is a measurement control method for an injection molding machine (measurement method) which, after a screw is retraced to a set screw position in the vicinity of the set measurement ending position, derives the screw rotation rate proportional to the position deviation between the set measurement ending position and the current screw retraction position, corrects the screw rotation rate based on the pressure deviation between the set resin pressure and the currently detected resin pressure, making it a screw rotation rate command to control the screw rotation rate.

However, the conventional measurement control method for an injection molding machine as described above had the following problems.

First, as in Patent Document 1, when adopting a control method that detects the screw position and the screw retraction rate and calculates the number of screw rotations to stop the screw at the measurement ending position while adopting the calculated number of screw rotations as a rotation drive command, the rotation rate of the screw near the measurement ending position infinitely approaches zero, thus requiring a significant amount of time until the screw arrives at the measurement ending position. Therefore, while it is advantageous in improving the control accuracy of the screw position, since the cycle time cannot be shortened, it is extremely disadvantageous in realizing a high-speed molding and limits in improvement of molding efficiency and mass productivity.

Further, as in Patent Document 2, when adopting a measurement control method which, after a screw is retracted to a set screw position in the vicinity of the set measurement ending position, derives the screw rotation rate proportional to the position deviation between the set measurement ending position and the current screw retraction position and corrects it based on the pressure deviation between the set resin pressure and the currently detected resin pressure to make it a screw rotation rate command, and control in the vicinity of the set measurement ending position becomes only position control, thereby fixing the control target. While it is advantageous in improving the control accuracy of the screw position, it introduces complications of control such as the necessity of controlling the screw rotation rate for controlling back pressure, making it difficult to secure responsiveness and stability in realizing the back pressure control within a section of minimal length.

Further, while it is required in measurement control that both screw rotation and retraction are reliably stopped at a measurement completion position (measurement ending position) for securing a high measurement precision, in the case of Patent Documents 1 and 2, no consideration is given to reliably stopping both screw rotation and retraction, thus they cannot deal with molding of, especially for instance, recent thin optical disks requiring a high degree of measurement precision.

SUMMARY OF THE INVENTION

The objective of the present invention is to provide a measurement control method of an injection molding machine which can secure a high degree of measurement precision and effectively remove residual resin pressure when stopped at a measurement ending position by accurately and reliably stopping both screw rotation and retraction at the measurement ending position.

Another objective of the present invention is to provide a measurement control method of an injection molding machine which can realize reliable and scatter-free pressure removal at each shot and obtain stable molding quality.

Further, another objective of the present invention is especially to provide a measurement control method of an injection molding machine that is sufficiently suited to the molding of, for instance, thin optical disks which recently require a high degree of measurement precision.

In order to achieve these objectives, the measurement control method of an injection molding machine relating to the present invention is characterized by the fact that, when a measurement is performed by rotating a screw, an ending target position corresponding to the measurement ending position, a rotation rate pattern for rotating the screw, and a virtual retraction rate pattern for retracting the screw are preset, the remaining rotation rate pattern for stopping the screw rotation at said ending target position is predicted by calculations based on screw positions detected at specified time intervals at the time of measurement, the screw is rotation controlled to said measurement ending position based on the rotation rate pattern, the remaining retraction rate pattern for stopping the screw retraction at said ending target position is predicted by calculations based on screw retraction rates detected at specified time intervals, the screw is retraction controlled to said measurement ending position based on the retraction rate pattern, the screw rotation and retraction are stopped when the screw has reached said measurement ending position, and afterwards the screw is reverse rotation controlled by a preset constant amount of rotation while positioning it at said measurement ending position.

BRIEF DESCRIPTION OF THE DRAWINGS

FIG. 7 (b) is a property plot of the screw retraction rate (retraction rate pattern) relative to time in the process following FIG. 7 (a) when the measurement control method is implemented.

FIG. 7 (c) is a property plot of the screw retraction rate (retraction rate pattern) relative to time in the process following FIG. 7 (b) when the measurement control method is implemented.

FIG. 7 (d) is a property plot of the screw retraction rate (retraction rate pattern) relative to time in the process following FIG. 7 (c) when the measurement control method is implemented.

FIG. 7 (e) is a property plot of the screw retraction rate (retraction rate pattern) relative to time in the process following FIG. 7 (d) when the measurement control method is implemented.

DETAILED DESCRIPTION OF THE PREFERRED EMBODIMENT

A detailed description is given hereafter utilizing preferred embodiments relating to the present invention with reference to drawings. In addition, the attached drawings are not for specifying the present invention but for making it easier to understand the present invention. Further, in order to avoid obscurity, a detailed description is omitted regarding the areas which are common knowledge.

First, the construction of an injection molding machine M, with which the measurement control method relating to the present embodiment can be implemented, is described with reference to FIG. 3 and FIG. 4.

Figure 3:
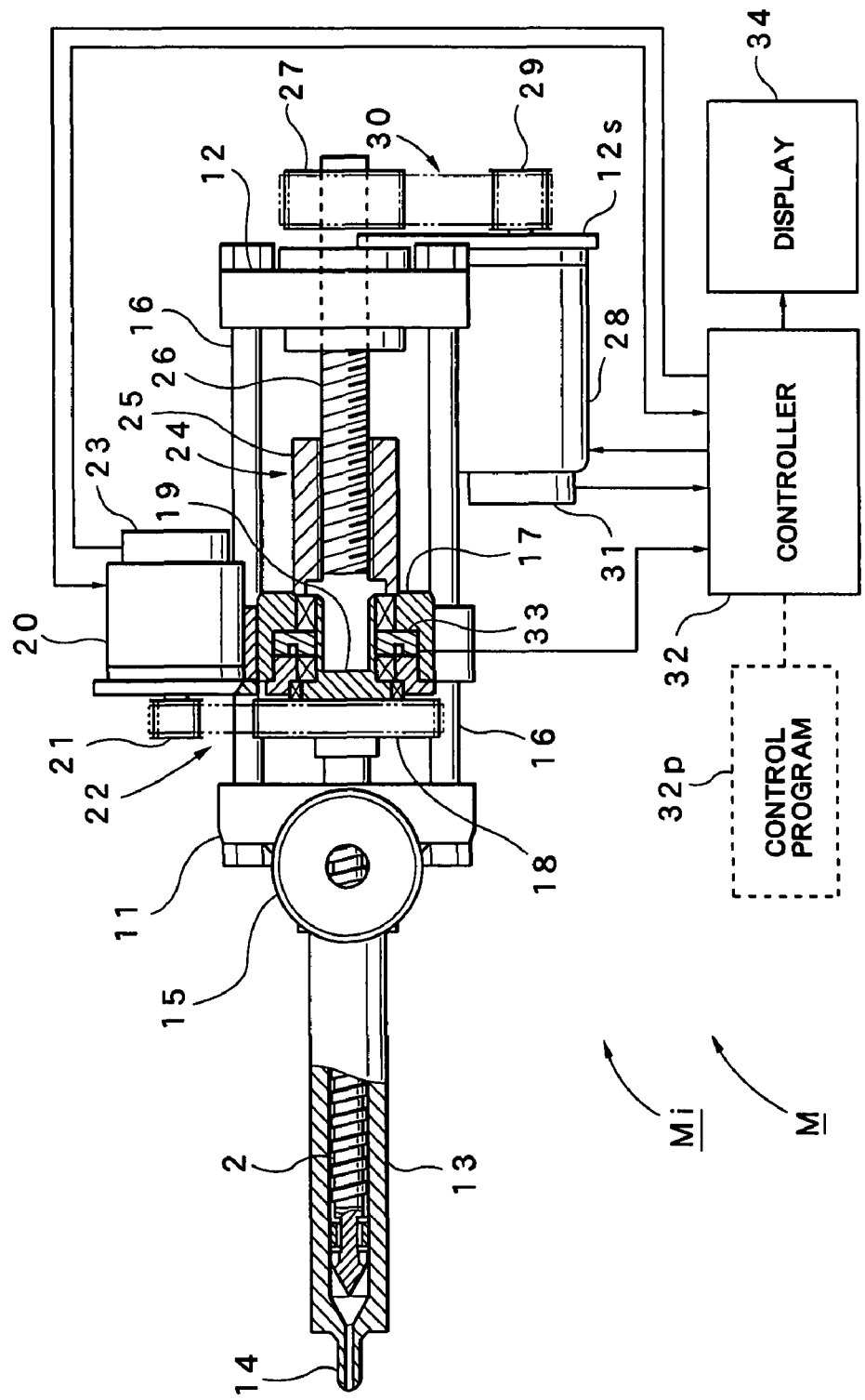
FIG. 3 is a partial cross-sectional plan view of an injection molding machine which enables implementation of the measurement control method.

In the injection molding machine M shown in FIG. 3, only an injection device Mi is shown, excluding a mold clamping device. The injection device Mi is equipped with an injection platform 11 and a driving platform 12 which are installed apart, and the rear end of a heating cylinder 13 is supported by the front surface of the injection platform 11. The heating cylinder 13 is equipped with an injection nozzle 14 at the front end and a hopper 15 in the rear section for supplying molding materials into the heating cylinder 13, and a screw 2 is inserted into the heating cylinder 13.

On the other hand, four tie bars 16 are installed between the injection platform 11 and the driving platform 12, and a sliding block 17 is loaded freely slidable on the tie bar 16. A rotary block 19 having an integrated driven wheel 18 is supported freely rotatable at the front end of the sliding block 17, and the rear end of a screw 2 is linked with the center of this rotary block 19. Further, a screw rotation servomotor (electric motor) 20 is attached to the side face of the sliding block 17, and a driving wheel 21 fixed to the rotation shaft of the servomotor 20 is connected to the driven wheel 18 through a rotation transmission mechanism 22. This rotation transmission mechanism 22 may be a gear transmission mechanism using a transmission gear, or a belt transmission mechanism using a timing belt. Furthermore, a rotary encoder 23 for detecting the rotation rate (the number of rotations) of the servomotor 20 is provided on the servomotor 20.

On the other hand, a nut unit 25 is integrally provided coaxially in the rear section of the sliding block 17, and a ball screw mechanism 24 is constructed by threading the front side of a ball screw unit 26 supported freely rotatable by the driving platform 12 into the nut unit 25. Further, a driven wheel 27 is mounted to the rear end of the ball screw unit 26 which protrudes backward from the driving platform 12, and a screw movement servomotor (electric motor) 28 is mounted on a supporting board 12s attached to the driving platform 12, and a driving wheel 29 fixed on the rotation shaft of this servomotor 28 is connected to the driven wheel 27 via a rotation transmission mechanism 30. The rotation transmission mechanism 30 may be a gear transmission mechanism using a transmission gear, or a belt transmission mechanism using a timing belt. Further, a rotary encoder 31 for detecting the rotation rate (the number of rotations) of the servomotor 28 is provided on the servomotor 28.

Furthermore, in FIG. 3, the numeral 32 indicates a controller provided in the injection molding machine M, which can execute a series of controls (sequence control) and calculations in the measurement control method relating to the present embodiment by a stored control program 32p. On the other hand, above mentioned servomotors 20 and 28, and the rotary encoders 23 and 31 are connected to the controller 32, respectively, and at the same time a pressure sensor (load cell) 33 which is provided between the rotary block 19 and the sliding block 17 is also connected. By the pressure sensor 33, back pressure Pd against the screw 2 can be detected. Furthermore, a display 34 is connected to the controller 32.

Figure 4:
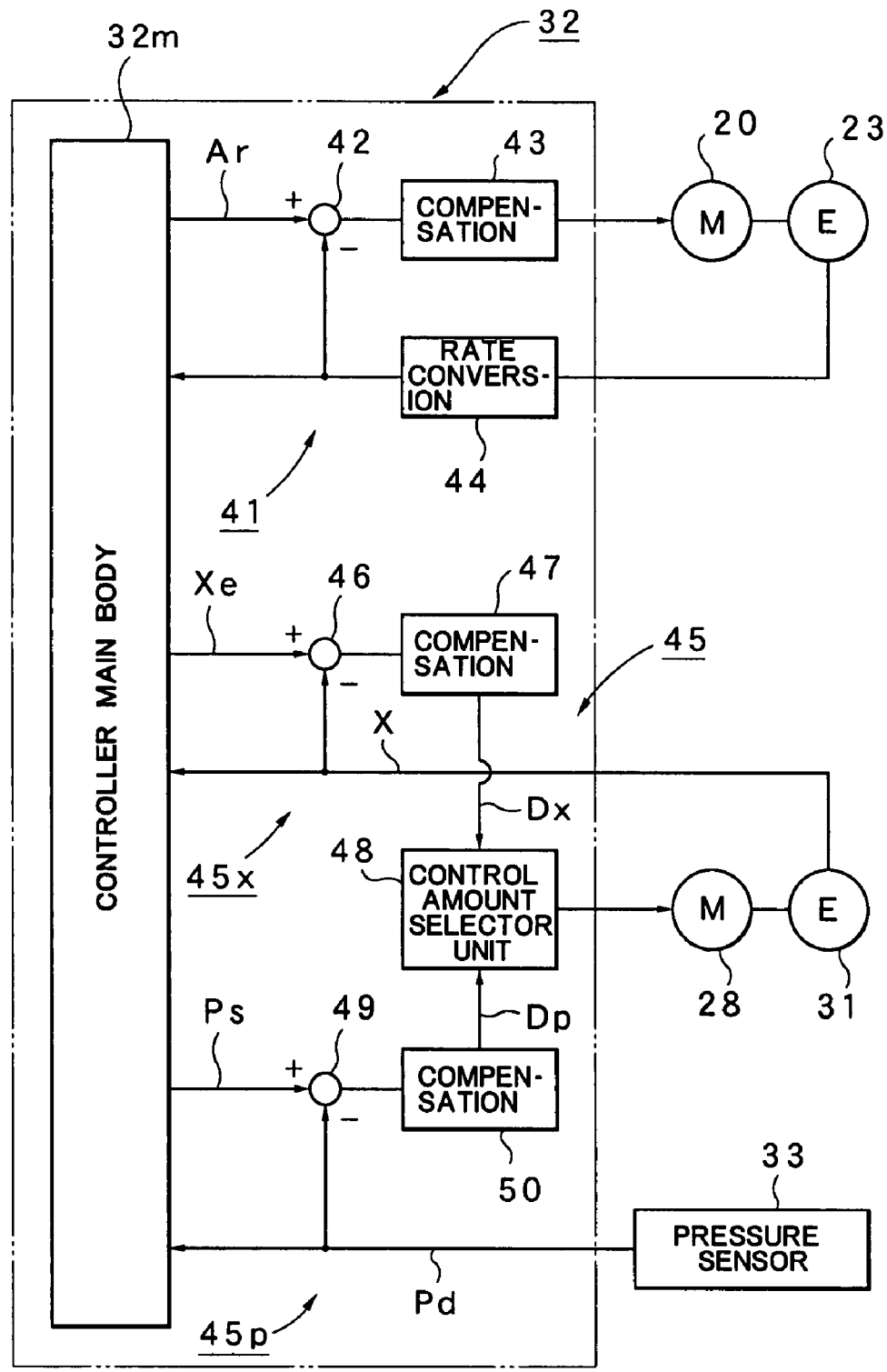
FIG. 4 is a block systemic diagram of the major functional unit of a controller provided in the injection molding machine.

FIG. 4 is a block systemic diagram of the major functional unit in the controller 32. In the same figure, 41 is a rate feedback control system in the screw rotation side, equipped with a deviation calculation unit 42, a rate compensation unit 43, and a rate conversion unit 44, and the output of the rate compensation unit 43 is supplied to the screw rotation servomotor 20. Further, a command value of the rotation rate for rotating the screw 2, more specifically, a command value of the rotation rate based on the rotation rate pattern Ar described later is supplied to one of the input units (non-inverting input unit) of the deviation calculation unit 42 from the controller main body 32m, and at the same time a detected value of the rotation rate of the screw 2 is supplied to the other input unit (inverting input unit) of the deviation calculation unit 42 from the rate conversion unit 44. A detected value of the rotation position of the screw 2 obtained from the rotary encoder 23 attached to the servomotor 20 is supplied to the input side of the rate conversion unit 44, and the detected value of the rotation position is converted to a detected value of the rotation rate by the rate conversion unit 44. The detected value of the rotation rate is also supplied to the controller main body 32m.

On the other hand, the numeral 45 indicates a feedback control system in the screw movement side, 45x a position feedback control system, and 45p a pressure feedback control system. The position feedback control system 45x is equipped with a deviation calculation unit 46 and a position compensation unit 47, and the output of the position compensation unit 47 (amount of position control Dx described later) is supplied to the control amount selection unit 48. Further, a preset measurement ending position Xe is supplied to one of the input units (non-inverting input unit) of the deviation calculation unit 46 as a command value from the controller main body 32m, and at the same time a screw position X (detected value) obtained from the rotary encoder 31 attached to the screw movement servomotor 28 is supplied to the other input unit (inverting input unit) of the deviation calculation unit 46. The screw position X is also supplied to the controller main body 32m. On the other hand, the pressure feedback control system 45p is equipped with a deviation calculation unit 49 and a pressure compensation unit 50, and the output of the pressure compensation unit 50 (amount of pressure control Dp described later) is supplied to the control amount selection unit 48. Furthermore, a back pressure Ps which becomes a command value is supplied to one of the input units (non-inverting input unit) of the deviation calculation unit 49 from the controller main body 32m, and at the same time a detected value (back pressure Pd) obtained from the pressure sensor 33 is supplied to the other input unit (inverting input unit) of the deviation calculation unit 49. The back pressure Pd is also supplied to the controller main body 32m.

Figure 1:
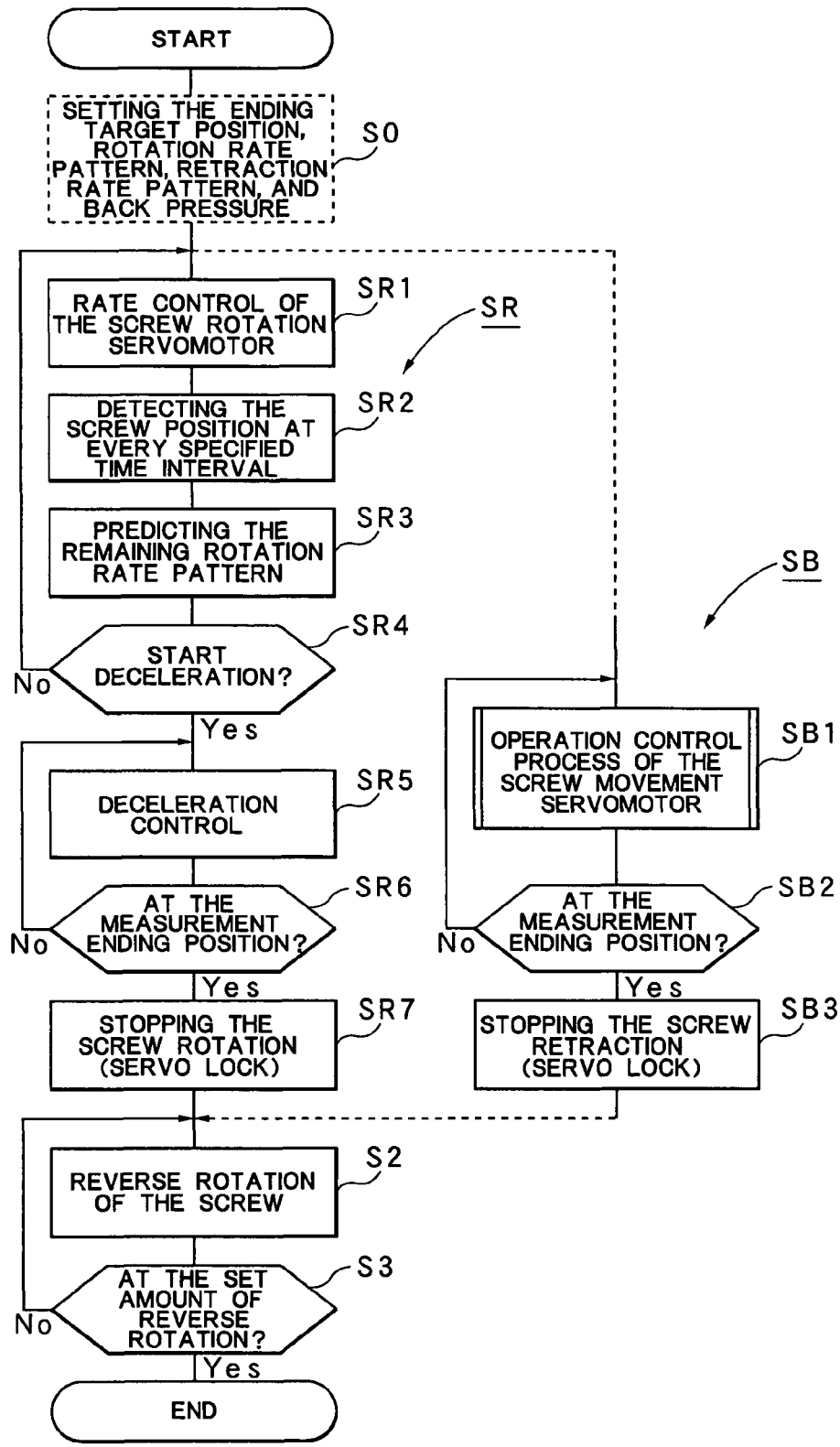
FIG. 1 is a flow chart showing the processing order of the measurement control method of an injection molding machine relating to the best embodiment of the present invention.
Figure 2:
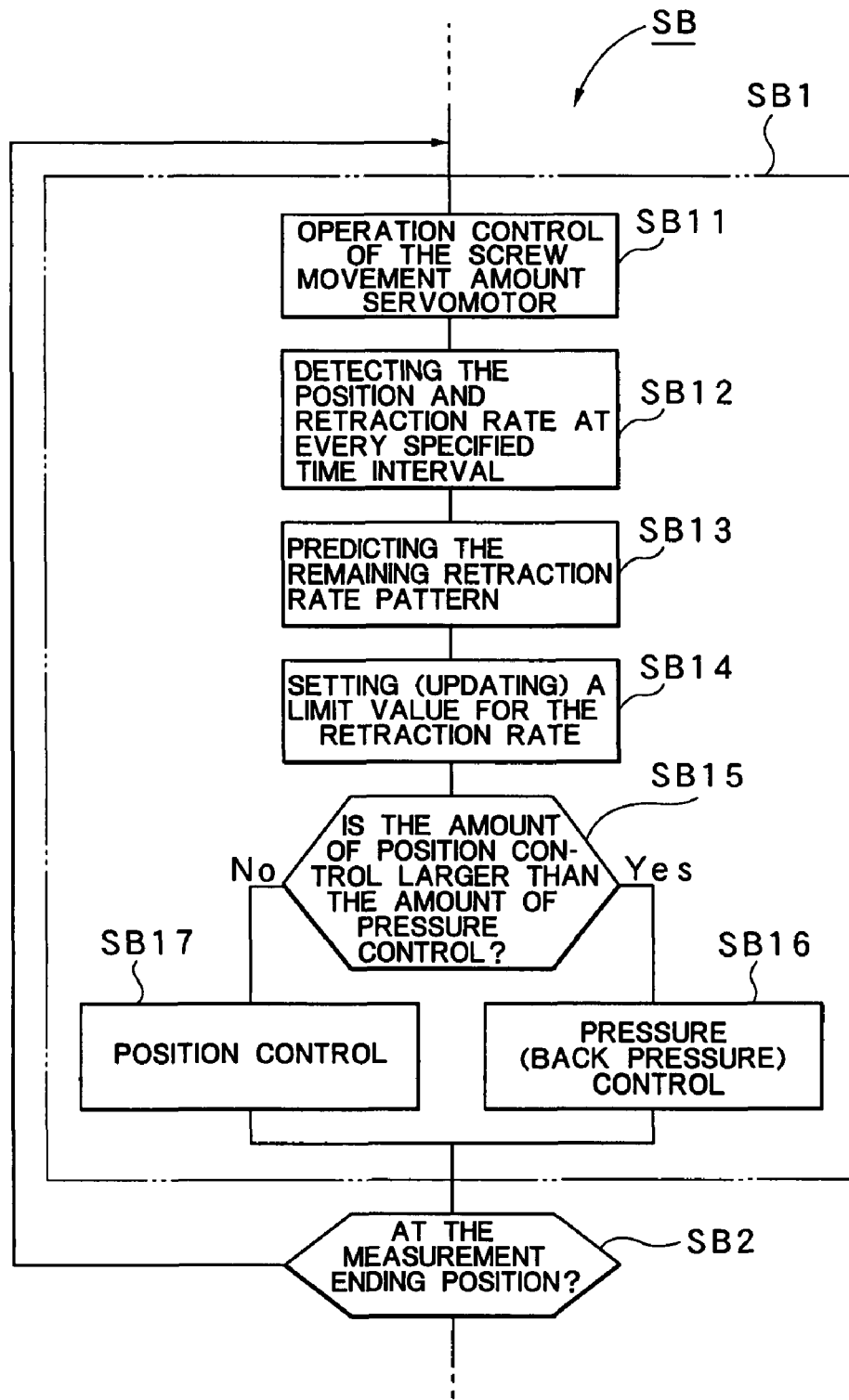
FIG. 2 is a flow chart showing the processing order of the measurement control method relating to the operation control of a screw movement servomotor in the measurement control method.

Next, a measurement control method relating to the present embodiment using such injection molding machine M is described according to flow charts shown in FIG. 1 and FIG. 2 with reference to FIG. 3 through FIG. 9.

As the fundamental operation in the measurement process, the screw 2 rotates by the screw rotation servomotor 20, molten resin is accumulated and measured in front of the screw 2, along with which the screw 2 is retracted, and back pressure is applied to the screw 2 by the screw movement servomotor 28. Then, when the screw 2 is retracted to the preset measurement ending position Xe, rotation and retraction of the screw 2 are stopped, after which the screw 2 is reverse rotated by a preset constant amount of rotation Rc while position controlling it to the measurement ending position Xe.

Below, the operation control of the screw rotation servomotor 20 side and the operation control of the screw movement servomotor 28 side are separately explained. In addition, the operation control of the screw rotation servomotor 20 and the operation control of the screw movement servomotor 28 are performed simultaneously while relating to each other (Steps SR and SB).

Figure 5:
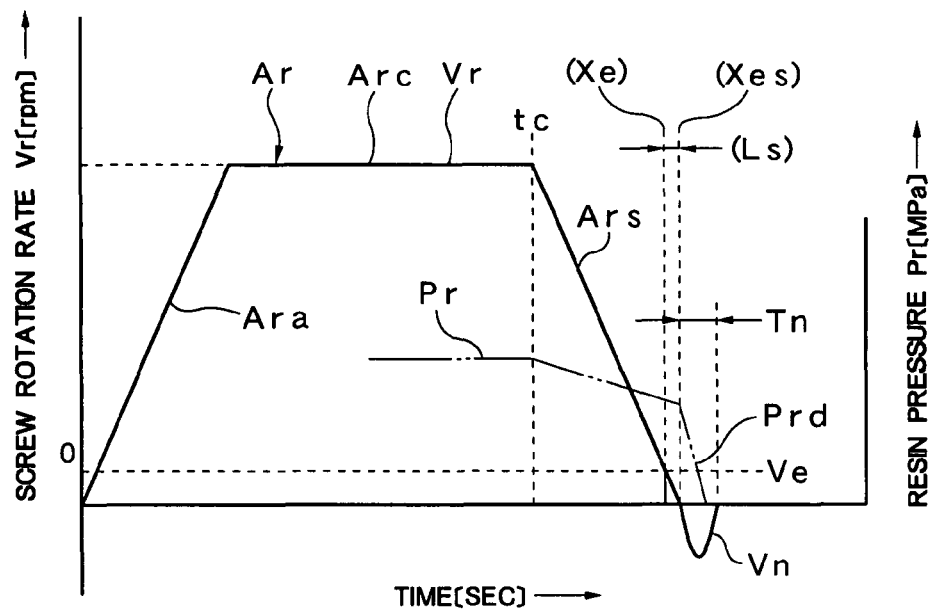
FIG. 5 is a property plot (rotation rate pattern) of the screw rotation rate relative to relative to time when the measurement control method is implemented.

First, an explanation is given regarding the operation control of the screw rotation servomotor 20 according to a flowchart shown in FIG. 1 with reference to FIG. 5. In addition, FIG. 5 shows a rotation rate pattern Ar, wherein the horizontal axis indicates time.

First of all, an ending target position Xes wherein a specified length Ls is added to the measurement ending position Xe and a rotation rate pattern Ar to rotate the screw 2 are pre-set (Step S0). In this case, a minimal length of about 0.01~0.05 mm can be arbitrarily selected as the specified length Ls. Further, the rotation rate pattern Ar, as shown in FIG. 5, is set by an acceleration section Ara wherein the rotation rate of the screw 2 is accelerated by a preset acceleration rate (acceleration factor), a constant rate section Arc wherein the rotation rate becomes constant from the end of this acceleration section Ara, and a deceleration section Ars wherein it is decelerated by a specified deceleration rate from the end of the constant rate section Arc. By this means, the measurement control method relating to the present invention for the screw rotation side can be implemented reliably and stably by including at least the constant rate section Arc and the deceleration section Ars in the rotation rate pattern Ar.

On the other hand, at the time of the measurement, a command value of the rotation rate to rotate the screw 2 is supplied to the deviation calculation unit 42 from the controller main body 32m based on the set rotation rate pattern Ar, and the operation control (rate control) of the screw rotation servomotor 20 is performed (Step SR1). In this case, the rate deviation of the rotation rate (detected value) of the screw 2 supplied from the rate conversion unit 44 and the rotation rate (commanded value) supplied from the controller main body 32m is obtained, and this rate deviation is supplied to the rate compensation unit 43 and the servomotor 20 after a rate compensation. By so doing, feedback control is performed to the rotation rate of the screw 2 so that the rotation rate (detected value) of the screw 2 can conform to the commanded value.

Further, during the operation of the servomotor 20, the screw 2 position (screw position X) is obtained at every specified time interval Ts (such as 50~200 μs) by the rotary encoder 31 (Step SR2). The controller main body 32m calculates a prediction on the remaining rotation rate pattern Ar to stop the rotation of the screw 2 at the ending target position Xes based on the screw position X detected at every specified time interval Ts (Step SR3). Namely, the amount of resin which is already measured can be derived by the detection of the actual screw position X, and the amount of remaining resin which should be measured can be calculated based on the amount of measured resin. Therefore, the rotation rate pattern Ar to stop at the ending target position Xes is predicted based on this amount of remaining resin. After making the prediction, the rotation of the screw 2 is controlled according to the predicted rotation rate pattern Ar. Further, since the ending target position Xes and the deceleration starting point tc shown in FIG. 5 are identified every time a prediction is made by the prediction of the rotation rate pattern Ar, when the screw 2 reaches the deceleration starting point tc shown in FIG. 5, the deceleration (deceleration section Ars) is initiated (Steps SR4 and SR5), and when the screw 2 reaches the measurement ending position Xe, the rotation of the screw 2 is stopped; in other words, the rotation of the servomotor 20 is stopped under control, and a servo lock is executed (Steps SR6 and SR7).

In this case, the rotation rate of the predicted rotation rate pattern Ar at the measurement ending position Xe is not zero but has a magnitude of Ve as shown in FIG. 5. However, when reaching the measurement ending position Xe, the screw rotation stop command is issued, and the rotation of the screw 2 is forcibly stopped under control. Because the magnitude of the rotation rate Ve at that time can be varied by selection of said specified length Ls, an optimal rate of the rotation rate Ve may be set by selecting the specified length Ls so that the time for reaching the measurement ending position Xe can be reduced and that the rotation of the screw 2 can be stopped promptly by issuing the screw rotation stop command. Accordingly, while the ration rate Vrs in the deceleration section Ars of the predicted rotation rate pattern Ar becomes zero at the ending target position Xes, the actual rotation rate Vrd becomes zero at the measurement ending position Xe.

On the other hand, when the screw 2 stops at the measurement ending position Xe controlled by the servomotor 20, the screw 2 is immediately position controlled to the measurement ending position Xe, and a reverse rotation control is performed to the screw 2 by a preset constant amount of rotation Rc while performing this position control (Steps S2 and S3). In this case, the constant amount of rotation Rc is selected from an angle range of 30~120°. In this embodiment, the rotation of the screw 2 can be precisely stopped at the measurement ending position Xe, and as described later, the retraction of the screw 2 can also be precisely stopped at the measurement ending position Xe. Then, because a reverse rotation control for depressurization is performed afterwards, residual resin pressure can be effectively removed, and especially secure depressurization without scattering becomes possible only through a reverse rotation by a constant amount of rotation at each shot.

Figure 6:
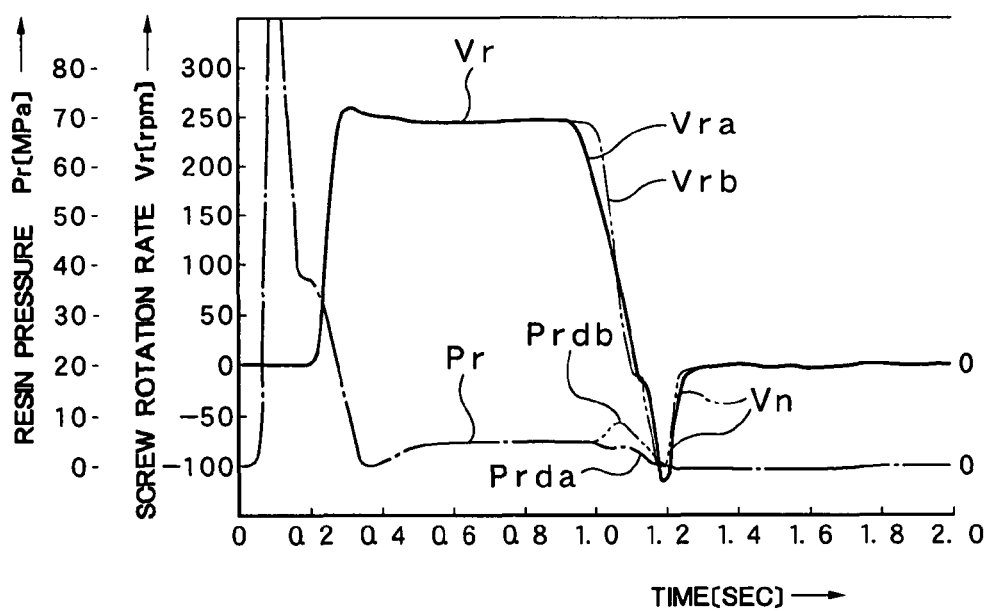
FIG. 6 is a property plot of the screw rotation rate and the resin pressure relative to time when the measurement control method is actually implemented.

In FIG. 5 and FIG. 6, Vr indicates the screw 2 rotation rate (rpm), Pr the resin pressure (MPa), Vn the screw 2 rotation rate under the reverse rotation control, and Prd the resin pressure under the reverse rotation control. Note that Tn indicates the reverse rotation control time (sec). Shown in FIG. 6 are actual measurement data of the screw 2 rotation rate Vr and the resin pressure Pr when the constant amount of rotation Rc is set to 60°, wherein Vrda indicates the rotation rate when the deceleration rate in the deceleration section Ars is set relatively low, Vrdb the rotation rate when the deceleration rate in the deceleration section Ars is set relatively high. Also shown are the residual resin pressure when Pra is controlled by the rotation rate Vra and the residual resin pressure when Prb is controlled by the rotation rate Vrb. As is clear from this, in removing the residual resin pressures Pra and Prb, because the deceleration rate in the deceleration section Ars has a large influence, it is preferred that the constant amount of rotation Rc should be set by considering the forms of the rotation rate pattern Ar to be set and the retraction rate pattern Ab described later.

Further, the depressurization effect on the residual resin pressure is significantly influenced by the kind of molding material. For example, in the case of thermoplastic resin materials (such as polybutyrene terephthalate (PBT) and polypropyrene (PP)), because their resin viscosity and resin compressibility are relatively high, the resin pressure is hard to remove due to the resin compression even by performing a reverse rotation control to the screw 2. On the other hand, in the case of amorphous resin materials (such as polycarbonate (PC), cyclicpolyolefin (COP), acryl (PMMA), and polystyrene (PS)), because their resin viscosity and resin compressibility are relatively low, residual resin pressure can be reliably removed. Especially, it has been confirmed that with amorphous resin materials the residual resin pressure can be reliably removed if the constant amount of rotation Rc is 90° or less, and that even with other molding materials such as thermoplastic resin materials the resin pressure can be sufficiently removed if the constant amount of rotation Rc is 120° or less. Therefore, if the constant amount of rotation Rc is selected from the angle range of 30~120° excluding the range below 30° where not much effect is expected, the measurement control method relating to the present embodiment can be effectively and appropriately implemented. Note that because depressurization is performed after stopping both rotation and retraction of the screw 2 precisely at the measurement ending position Xe, the reverse rotation control time Tn can be relatively short, contributing to the reduction of the molding cycle, namely the promotion of high-speed molding.

Figure 7:
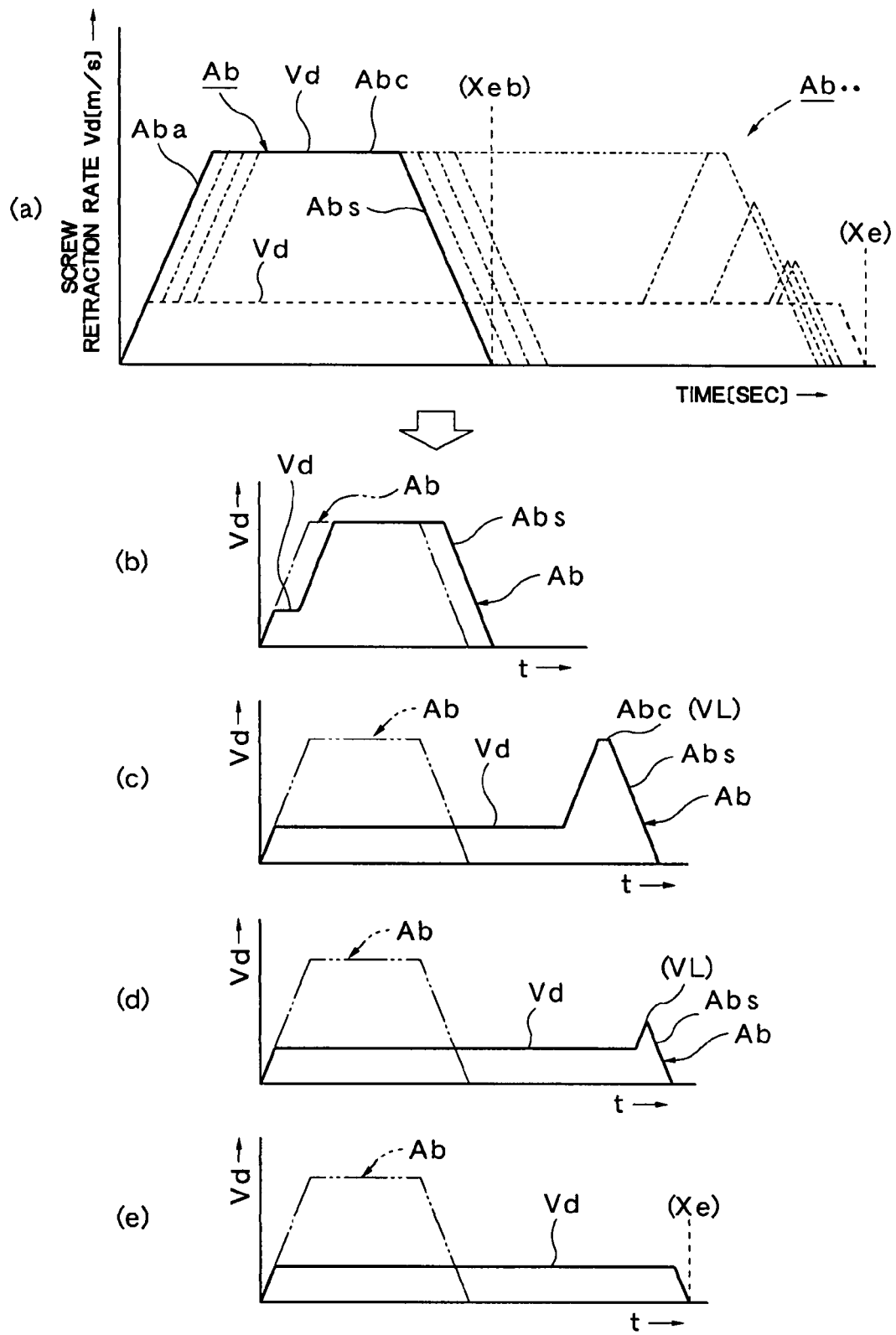
FIG. 7 (a) is a property plot of the screw retraction rate (retraction rate pattern) relative to time when the measurement control method is implemented.
Figure 8:
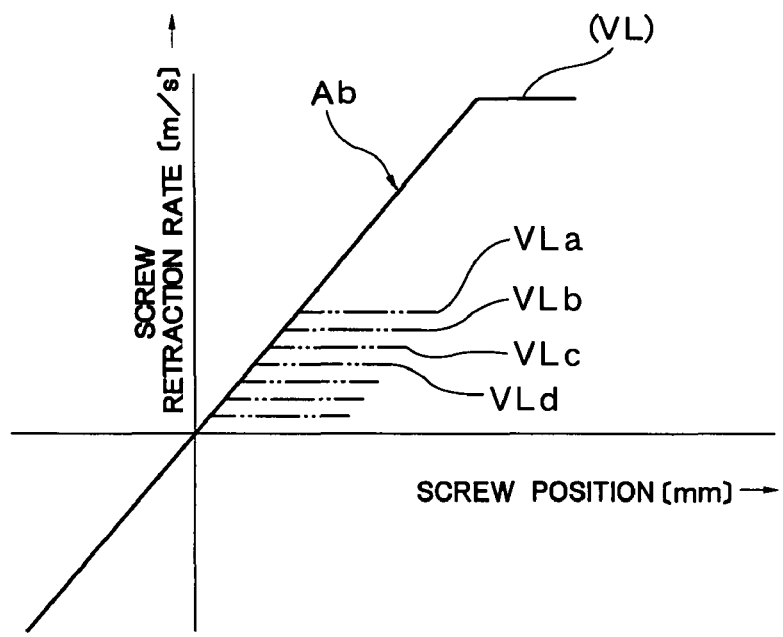
FIG. 8 is an explanatory diagram of the modification principle of the limit value for the screw retraction rate when the measurement control method is implemented.
Figure 9:
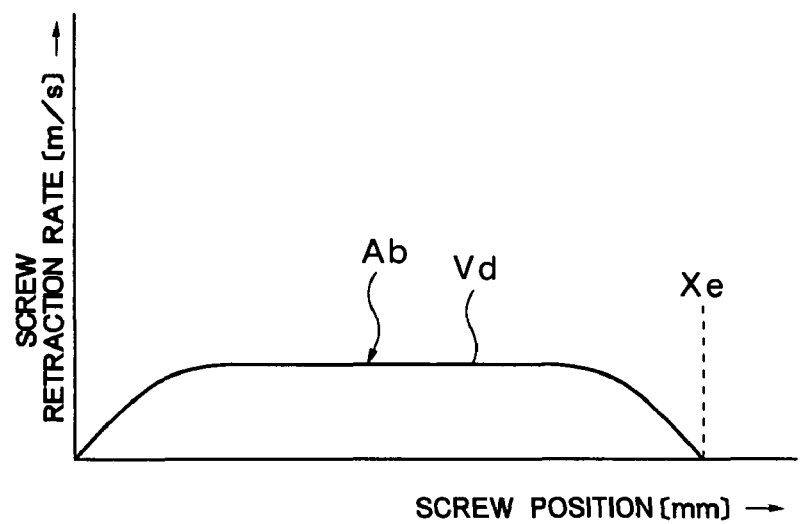
FIG. 9 is a property plot of the screw retraction rate (retraction rate pattern) for the screw position when the measurement control method is implemented.

Next, an explanation is given regarding the operation control of the screw movement servomotor 28 with reference to FIG. 7 through FIG. 9.

First, back pressure Ps against the screw 2 and a hypothetical retraction rate pattern Ab for the screw 2 to retract are pre-set (Step S0). In this case, the retraction rate pattern Ab is set, as shown with a solid line in FIG. 7 (a), with an acceleration section Aba wherein the retraction rate of the screw 2 is accelerated at a specified acceleration rate (acceleration factor), a constant rate section Abc wherein the retraction rate becomes constant from the end of the acceleration section Aba, and a deceleration section Abs wherein it is decelerated at a preset deceleration rate from the end of the constant rate section Abc. Here, Xeb indicates the hypothetical measurement ending position in the retraction rate pattern Ab. Further, the retraction rate of the screw 2 in the constant rate section Abc is set larger than the actual retraction rate Vd of the screw 2. In other words, a rate which never occurs in reality in relation to the actual retraction rate Vd which is envisioned in advance, is set. In this way, the measurement control method relating to the present invention for the screw retracting side can be implemented reliably and stably by including at least the constant rate section Abc and the deceleration section Abs in the retraction rate pattern Ab and setting the retraction rate of the screw 2 in the constant rate section Abc larger than the actual retraction rate Vd of the screw 2.

On the other hand, at the time of measurement, retraction control is performed to the screw 2 by controlling the operation of the screw movement servomotor 28 (Step SB1). A flow chart of the operation control process to this screw movement servomotor 28 is shown in FIG. 2. First, the screw movement servomotor 28 is controlled to operate to detect the screw position X and the retraction rate Vd of the screw 2 at every specified time interval Ts (such as 50~200 µs) (Steps SB11 and SB12). Then, the remaining retraction rate pattern Ab is predicted by calculation from the detected retraction rate Vd (Step SB13). In other words, the amount of resin already measured can be known by detecting the actual retraction rate Vd (screw position X), and the remaining amount of resin to be measured can be calculated based on the amount of resin already measured, thus a calculation may be performed so that the sum of the amount of resin already measured and the remaining amount of resin to be measured coincides with the integrated area of the retraction rate pattern Ab shown in FIG. 7 (a), by which the remaining retraction rate pattern Ab can be easily predicted. The predicted retraction rate pattern Ab is shown with the hypothetical line in FIG. 7(a), and the predicted retraction rate patterns Ab at different times are shown in FIG. 7 (b), FIG. 7 (c), FIG. 7 (d), and FIG. 7 (e).

Further, a limit value VL is set (changed) for the retraction rate of the screw 2 based on the maximum value of the predicted remaining retraction rate pattern Ab (Step SB14) in the controller 32m. In this manner, by setting the limit value VL based on the maximum value of the predicted remaining retraction rate pattern Ab, the measurement control method relating to the present invention for the screw retracting side can be implemented easily and reliably.

On the other hand, at the time of measurement, back pressure Ps that becomes a command value is supplied to the deviation calculation unit 49 from the controller 32m. The pressure deviation of this back pressure Ps and the back pressure Pd (detected value) obtained from the pressure sensor 33 is derived in the deviation calculation unit 49, and the pressure deviation is supplied to the pressure compensation unit 50. After a pressure compensation is performed by the pressure compensation unit 50, it is supplied to a control amount selection unit 48 as the amount of pressure control Dp to control the back pressure. Further, a command value of the measurement ending position Xe is supplied to the deviation calculation unit 46 from the controller 32m, and the position deviation of the command value of this measurement ending position Xe and the screw position X (detected value) obtained by the rotary encoder 31 is derived in the deviation calculation unit 46, and after its position is compensated by the position compensation unit 47, this position deviation is supplied to the control amount selection unit 48 as the amount of position control Dx to perform the position control to the measurement ending position Xe.

The control amount selection unit 48 selects and outputs the smaller of either the amount of pressure control Dp supplied from the pressure compensation unit 50 or the amount of position control Dx supplied from the position compensation unit 47. By so doing, the selected amount of pressure control Dp or the amount of position control Dx is supplied to the servomotor 28 (Step SB6). Accordingly, when the amount of pressure control Dp is smaller than the amount of position control Dx, the pressure control (back pressure control), in other words, feedback control is performed on the back pressure Pd so as to conform to the set back pressure Ps (Steps SB15 and SB16). On the other hand, when the amount of position control Dx is smaller than the amount of pressure control Dp, the position control, in other words, feedback control is performed on the screw position X so as to conform to the measurement ending position Xe (Steps SB15 and SB17).

In this case, because the limit value VL for the retraction rate of the screw 2 is set large from the beginning of measurement to the vicinity before the measurement ending position Xe, pressure control (back pressure control) is basically performed. In other words, because the constant rate section Abc remains in the predicted retraction rate pattern Ab as shown in FIG. 7 (b) and FIG. 7 (c), the retraction rate (maximum value) of this constant rate section Abc is set as the limit value VL, and the amount of position control Dx becomes relatively large in relation to the amount of pressure control Dp.

On the other hand, after the screw 2 reaches the vicinity before the measurement ending position Xe, because there is no constant rate section Abc of the retraction rate pattern Ab along with retraction of the screw 2 as shown in FIG. 7 (d), having only the deceleration section Abs remaining, the maximum value of the retraction rate pattern Ab decreases along with the deceleration section Abs, and the limit value VL also decreases. As a result, the limit value VL is set so as to decrease gradually along with the retraction of the screw 2 as shown with VLa, VLb, VLc, VLd, and so forth in FIG. 8. Consequently, the screw 2 retraction rate is regulated by the limit value VL, generating cases where the amount of position control Dx becomes smaller than the amount of pressure control Dp from the vicinity before the measurement ending position Xe to the measurement ending position Xe. As described above, the control amount selection unit 48 evaluates the magnitudes of the amount of position control Dx and the amount of pressure control Dp, and when the amount of position control Dx is smaller than the amount of pressure control Dp, the position control, in other words, feedback control, is performed on the position so that the screw position X becomes the measurement ending position Xe (Steps SB15 and SB17), and also when the amount of pressure control Dp is smaller than the amount of position control Dx, the back pressure control, in other words, feedback control, is performed on the pressure so that the back pressure Pd conforms to the set back pressure Ps (Steps SB15 and SB16).

Actually, the amount of pressure control Dp (pressure deviation) for the back pressure is considerably small, therefore, it is unclear as to whether feedback control on the position or feedback control on the pressure is selected. However, by selecting the one which has the smaller amount of control, the retraction of the screw 2 can be stably and reliably stopped at the measurement ending position Xe.

Subsequently, when the screw 2 reaches the measurement ending position Xe, the retraction of the screw 2 is stopped, in other words, the rotation of the servomotor 28 is controlled to stop, and a servo lock is performed as shown in FIG. 1 (Steps SB2 and SB3). This state is shown in FIG. 7 (e). The retraction rate Vd of the screw 2 becomes zero in this state. Shown in FIG. 7 (e) is the retraction rate pattern based on the actually-detected retraction rate Vd. Further, the retraction rate Vd of the screw 2 is illustrated in FIG. 9, where the horizontal axis indicates the screw position X. However, because the retraction rate Vd varies in proportion to the rotation rate of the screw 2, it shows nearly the same waveform with the rotation rate pattern Ar of the screw 2 having the horizontal axis as the screw position X even though the vertical axis range is different.

Figure 10:
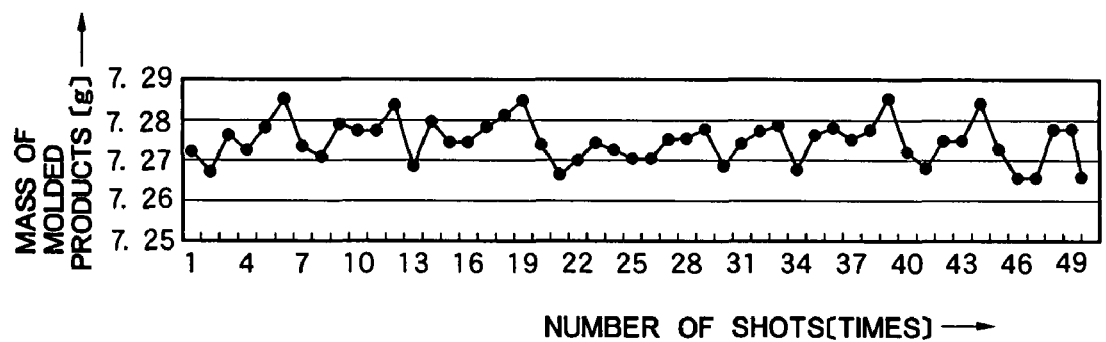
FIG. 10 is a variation data plot of the molded product mass against the number of shots when the measurement control method is employed.
Figure 11:
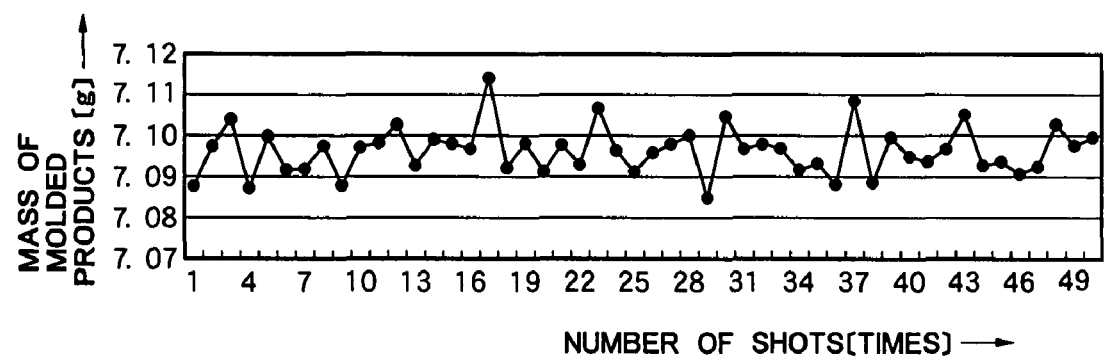
FIG. 11 is a variation data plot of the molded product mass against the number of shots when the reverse rotation control in the measurement control method is not performed.

In this way, because the operation control of the screw movement servomotor 28 side and the operation control of the screw rotation servomotor 20 side are performed simultaneously, both rotation and retraction of the screw 2 can be stopped precisely and reliably at the set measurement ending position Xe, securing a high measurement accuracy. Shown in FIG. 10 is the mass of the molded products against the number of shots for an operation control utilizing the measurement control method relating to the present embodiment, namely for the case where the rotation and retraction of the screw 2 are stopped when the screw 2 reaches the measurement, after which the screw 2 is reverse rotated by 60° as the constant amount of rotation Rc while position controlling it to the measurement ending position Xe. As is clear from the figure, scatter in the mass of the molded products is kept within an approximate range of 7.265~7.285 g, and the scatter (error) R is about 0.02. Correspondingly, shown in FIG. 11 is the mass of the molded products against the number of shots wherein the rotation and retraction of the screw 2 are stopped when the screw 2 reaches the measurement ending position Xe, after which no reverse rotation control was performed. In this case, the mass of the molded products are dispersed in the range of approximately 7.084~7.115 g, and the scatter (error) R is about 0.03.

Thus, by stopping the rotation and retraction of the screw 2 when the screw 2 reaches the measurement ending position Xe and afterwards reverse rotating the screw 2 by a constant amount of rotation Rc while position controlling it at the measurement ending position Xe, a more preferable result is obtained, especially thin optical disks to which a high level of measurement accuracy is recently demanded can be molded, and a high-quality, stable molding becomes possible, wherein so-called silver streaks do not occur.

In the present embodiment, in performing the operation control of the screw rotation servomotor 20 side, an ending target position Xes which is the measurement ending position Xe with a specified length Ls added and a rotation rate pattern Ar to rotate the screw 2 are set, the screw position X is detected at every specified time interval Ts, the remaining rotation rate pattern Ar to stop the rotation of the screw 2 at the ending target position Xes is predicted by calculation from the detected screw position X, the screw 2 is rotation controlled according to the predicted rotation rate pattern Ar, and when the screw 2 reaches the measurement ending position Xe, the rotation of the screw 2 is controlled to stop, making it possible to reduce the cycle time while increasing the control accuracy of the measurement ending position Xe, having the advantage of improving the molding efficiency and mass productivity while maintaining a high molding quality and further realizing a high-speed molding. In addition, in performing the operation control of the screw movement servomotor 28 side, a back pressure Ps against the screw 2 and a hypothetical retraction rate pattern Ab for retracting the screw 2 are set, the retraction rate Vd of the screw 2 is detected at every specified time interval Ts, the remaining retraction rate pattern Ab is predicted by calculation based on the detected retraction rate Vd, a limit value VL (VLa, . . . ) for the retraction rate is set, the screw 2 is controlled to retract by selecting at the time of prediction the smaller amount of control from either the amount of pressure control Dp to perform a back pressure control or the amount of position control Dx to perform position control to the measurement ending position Xe, and when the screw 2 reaches the measurement ending position Xe, the retraction of the screw 2 is controlled to stop. Therefore, there are advantages of increasing the precision and ease of position control of the measurement ending position Xe and enhancing the responsiveness and stability of control, by which realizing a reliable and precise back pressure control in a section of a tiny length.

While an explanation was given on the best embodiment, the present invention is not limited to such an embodiment as this, but can be arbitrarily changed in terms of detailed construction, quantity, numerical value, technique, and so on within a range that does not deviate from the spirit of the present invention, and can be added to or removed from upon necessity.

For instance, while an electric type using servomotors 20 and 28 were explained as an example for the injection molding machine M, other driving types such as a hydrodynamic drive type using a hydraulic cylinder or oil motor may also be used. Further, explanations were given on a case wherein at least the constant rate section Arc where the rotation rate of the screw 2 is constant and the deceleration section Ars to decelerate by a specified deceleration rate from the end of this constant rate section Arc were included in the rotation rate pattern Ar while at least the constant rate section Abc where the retraction rate of the screw 2 is constant and the deceleration section Abs to decelerate by a specified deceleration rate from the end of this constant rate section Abc were included in the retraction rate pattern Ab. However, neither is limited to the case where deceleration is performed by a specified deceleration rate, and the deceleration patterns of the deceleration sections Ars and Abs are arbitrary. Furthermore, while the operation control method relating to the present invention can be suitably used for molding the optical disk shown as an example, it can also be suitably used especially for molded products (resin materials) for the use of optics such as lenses.

What is claimed is:

1. A measurement control method for an injection molding machine in which a measurement is performed by rotating a screw, comprising the following steps:
setting a first ending target position corresponding to a measurement ending position,
setting a rotation rate pattern to rotate the screw,
retracting the screw at a predetermined retraction rate pattern wherein the retraction is pre-set,
setting the first ending target position at a time of measurement of a remaining rotation rate pattern to stop the screw rotation at said first ending target position is predicted by a calculation based on a screw position detected at every specified time interval,
controlling the screw rotation to the first ending target position based on the remaining rotation rate pattern and thereafter performing a reverse rotation to apply a back pressure to the screw,
stopping a screw retraction at a second ending target position predicated by a calculation based on a screw retraction rate detected at every specified time interval,
controlling the screw based on the retraction rate pattern to retract to said second ending target position,
stopping the rotation and retraction of the screw when the screw reaches said second ending target position, and
subsequently controlling the screw to reverse rotate by a preset constant amount of rotation while controlling the position of the screw to cause a depressurization.

2. The measurement control method of an injection molding machine according to claim 1, wherein said rotation rate pattern includes at least a constant rate section in which the rotation rate of the screw is constant and a deceleration section in which the rotation rate of the screw is decelerated from the end of the constant rate section by a predetermined deceleration rate.

3. The measurement control method of an injection molding machine according to claim 1, wherein said measurement ending position with a specified length added is used as said first ending target position.

4. The measurement control method of an injection molding machine according to claim 1, wherein the back pressure against the screw and a limit value for the screw retraction rate are set in retraction controlling said screw, and the screw is controlled to retract by selecting the smaller amount of control of either an amount of pressure control to perform a back pressure control or the amount of position control to perform a position control to said measurement ending position in predicting the remaining retraction rate pattern.

5. The measurement control method of an injection molding machine according to claim 4, wherein said retraction rate pattern includes at least a constant rate section in which the screw retraction rate becomes constant and a deceleration section in which the screw retraction rate is decelerated at a predetermined deceleration rate from the end of this constant rate section.

6. The measurement control method of an injection molding machine according to claim 5, wherein said retraction rate pattern includes an acceleration section in which the screw retraction rate is accelerated by a specified acceleration rate to said constant rate section.

7. The measurement control method of an injection molding machine according to claim 5, wherein the screw retraction rate in said constant rate section is set larger than an actual screw retraction rate.

8. The measurement control method of an injection molding machine according to claim 4, wherein said limit value is set based on a maximum value of the predicted remaining retraction rate pattern.

9. The measurement control method of an injection molding machine according to claim 1, wherein said constant amount of rotation is selected from an angle range of 30~120°.

10. The measurement control method of an injection molding machine according to claim 1, wherein said rotation rate pattern includes at least a constant rate section in which the screw rotation rate becomes constant and a deceleration section in which the screw rotation rate is decelerated by a predetermined deceleration rate from the end of this constant rate section.

11. The measurement control method of an injection molding machine according to claim 10, wherein said rotation rate pattern includes an acceleration section in which the screw rotation rate is accelerated by a predetermined acceleration rate to said constant rate section.

12. The measurement control method of an injection molding machine according to claim 1, wherein it is applied to amorphous resin materials as a molding material.

* * * * *